United States Patent
Brubaker (10) Patent No.: US 8,010,261 B2
(45) Date of Patent: Aug. 30, 2011

(54) AUTOMATIC STEERING CORRECTION OF AN AGRICULTURAL HARVESTER USING INTEGRATION OF HARVESTER HEADER ROW SENSORS AND HARVESTER AUTO GUIDANCE SYSTEM

(75) Inventor: Christopher A. Brubaker, Leola, PA (US)

(73) Assignee: CNH America LLC, New Holland, PA (US)

(*) Notice: Subject to any disclaimer, the term of this patent is extended or adjusted under 35 U.S.C. 154(b) by 1119 days.

(21) Appl. No.: 11/805,366

(22) Filed: May 23, 2007

(65) Prior Publication Data

US 2008/0289308 A1  Nov. 27, 2008

(51) Int. Cl.
  *G06F 7/70* (2006.01)
  *G06F 19/00* (2011.01)
  *G06G 7/00* (2006.01)
  *G06G 7/76* (2006.01)

(52) U.S. Cl. ............... 701/50; 701/1; 701/41; 701/213; 460/1; 56/10.1; 56/10.2 F; 56/15.4; 56/15.5

(58) Field of Classification Search ............ 701/1, 41, 701/50, 213; 56/10.1, 10.2 D, 10.2 E, 10.2 F, 56/14.7, 15.4, 15.5; 460/1; 340/901
See application file for complete search history.

(56) References Cited

U.S. PATENT DOCUMENTS

| | | | |
|---|---|---|---|
| 4,126,984 A * | 11/1978 | Gail | 56/10.2 R |
| 4,166,349 A | 9/1979 | Coenenberg et al. | 56/10.2 |
| 4,193,250 A * | 3/1980 | Kessens et al. | 56/208 |
| 4,304,316 A | 12/1981 | Lang | 180/131 |
| 4,505,094 A | 3/1985 | Demorest | 56/10.2 |
| 4,663,918 A | 5/1987 | Williams et al. | 56/10.2 |
| 4,726,175 A | 2/1988 | Day, V et al. | 56/10.2 |
| 4,967,362 A * | 10/1990 | Schutten et al. | 701/50 |
| 5,019,983 A | 5/1991 | Schutten et al. | 364/424.07 |
| 5,307,611 A | 5/1994 | Vardeman et al. | 56/10.2 |
| 5,313,769 A | 5/1994 | Barnes et al. | 56/10.2 |
| 5,694,751 A | 12/1997 | Behnke | 56/10.2 F |
| 5,782,072 A * | 7/1998 | Matthews | 56/10.2 F |
| 5,928,309 A | 7/1999 | Korver et al. | 701/214 |
| 6,199,000 B1 * | 3/2001 | Keller et al. | 701/50 |
| 6,697,724 B2 | 2/2004 | Beck | 701/50 |
| 7,792,622 B2 * | 9/2010 | Wei et al. | 701/50 |
| 2004/0193348 A1 * | 9/2004 | Gray et al. | 701/50 |
| 2005/0015189 A1 * | 1/2005 | Posselius et al. | 701/50 |
| 2005/0090960 A1 | 4/2005 | Brunnert et al. | 701/50 |
| 2005/0171693 A1 * | 8/2005 | Lange et al. | 701/209 |
| 2006/0178825 A1 * | 8/2006 | Eglington et al. | 701/211 |
| 2006/0282205 A1 * | 12/2006 | Lange | 701/50 |
| 2007/0001097 A1 * | 1/2007 | Wei et al. | 250/208.1 |

(Continued)

FOREIGN PATENT DOCUMENTS

FR  2727276  5/1996

*Primary Examiner* — Khoi Tran
*Assistant Examiner* — Jamie Figueroa
(74) *Attorney, Agent, or Firm* — Michael G. Harms; Patrick M. Sheldrake (57) ABSTRACT

A method and system for automatically correcting a steering command from an auto guidance system to adjust for misalignments between the crop rows and the header due to errors which may include, but are not limited to a stack up of errors from the remote positioning system information translation, planter and harvester machine centerline differences, harvesting and planting pattern differences, and the like, that integrates row sensor information into the auto guidance system.

6 Claims, 7 Drawing Sheets

U.S. PATENT DOCUMENTS

| | | | |
|---|---|---|---|
| 2007/0005208 A1 | 1/2007 | Han et al. | 701/50 |
| 2007/0021913 A1* | 1/2007 | Heiniger et al. | 701/213 |
| 2007/0083299 A1* | 4/2007 | Lindores | 701/2 |
| 2008/0103690 A1* | 5/2008 | Dix | 701/207 |
| 2008/0249692 A1* | 10/2008 | Dix | 701/50 |
| 2009/0118904 A1* | 5/2009 | Birnie | 701/41 |

* cited by examiner

AUTOMATIC STEERING CORRECTION OF AN AGRICULTURAL HARVESTER USING INTEGRATION OF HARVESTER HEADER ROW SENSORS AND HARVESTER AUTO GUIDANCE SYSTEM

TECHNICAL FIELD

This invention relates to automatic steering control of an agricultural harvester, such as a combine, and more particularly to a method for automatically responding to misalignment between the header and rows of crops such as corn, cotton and the like, with a steering correction based on integration of harvester row sensor information into the harvester auto guidance system.

BACKGROUND ART

An agricultural harvesting machine for harvesting corn or maize includes a specialized header assembly for separating and guiding crops during harvesting. This header assembly typically uses row separators which create an opening to guide the stalks of the crops into stalkways containing snapping rolls that separate the crop from the stalk. Accurate positioning of the crop prior to reaching the snap rolls is important to prevent excessive crop waste due to corn head loss and the like.

Modern work machines, such as tractors and agricultural combine harvesters are often equipped with remote positioning systems such as a Differential Global Positioning System (DGPS) for use with auto guidance systems. These positioning systems are limited in their ability to accurately function in crops requiring increased steering accuracy, such as corn and the like, due to "stack up" of errors. Although the DGPS may provide relatively precise accuracy as to the position of the DGPS sensor, mathematical translation of that position to the position of the planter may introduce approximation and rounding errors, and the like, which may be further compounded when translating the position of the DGPS sensor on the combine to the position of the header during harvesting. These errors may be further compounded by uneven terrain such as hills and depressions and the like. Errors may be introduced, in part, due to approximations in the height of the DGPS sensor as compared to the ground and/or header height, as well as approximations of the distance fore or aft of the DGPS sensor of the planter and/or header.

In addition, the harvesting machine will likely travel a different swath order based on a different centerline than the planting machine. For example, it is not unusual to use a 24 row planter and an 8 row harvester in a particular field. The row map created using the 24 row planter uses a different reference line or machine centerline than that of the 8 row harvester. It is also beneficial to have the capability to skip passes when harvesting a field allowing the harvester to operate in a control traffic scheme that can reduce compaction and increase yield as well as allowing traditional and high value or specialized crops to be harvested from a single field.

It is also desirable to unload on the go with a cart driving alongside the harvester on the left or unloading side of the machine. Thus the harvesting machine may follow a swath pattern that skips passes to always provide a previously harvested swath or road on its unloading side.

These planting and harvesting variations and other sources of error may degrade the accuracy of the information used by the auto guidance system. Thus the auto guidance system may not achieve the +/−4 inch accuracy at the corn head row unit required for harvesting corn. Undesirable harvesting conditions, including excessive head loss may result if the crop is more than +/−4 inches from the centerline of the snapping rolls of the harvester.

The specialized headers used for harvesting corn, and the like, include sensors on the row separators extending into the opening through which the crops pass, which sensors are sensitive to physical contact with the crops. When the sensors detect the presence of crops that are not centered between the row separators, misalignment between the header and the crop row may exist. Many combines include a "nudging" capability to supplement the auto guidance system and improve header and crop alignment. The auto guidance system uses a reference line that extends between the ends of a swath of a field called an a-b line. When the operator notices that the header and the crop row are out of alignment, the operator implements one or more nudge commands. Each command shifts the auto guidance system a-b line by a small increment, for example, 10 centimeters, to realign the header with the crop row. Inattention or operator fatigue may result in a delay in implementing the nudge command and/or undercorrection or overcorrection thus leading to undesirable harvesting characteristics and even crop loss.

Reference in the above regard, Day, V et al., U.S. Pat. No. 4,726,175, which discloses a guidance control system that links the row sensors directly to one steerable wheel actuator. As the row sensors detect misalignment between the crop and the header, a valve is opened allowing hydraulic fluid flow to the steerable wheel's actuator to turn the wheel in a direction for realigning the header and the crop row. However, it is foreseen that use of a system such as this could be problematic when used with an auto guidance steering system. For instance, it is foreseen that the actuation of the steerable wheel in response to the row sensor could be interpreted by the auto guidance system as a steering error that needs to be corrected. Thus, the row sensor correction and the auto guidance system commands may conflict, causing a series of commands or inputs resulting in an oscillation of the steerable wheel.

Accordingly, what is sought is an auto guidance system which includes automatic steering correction in response to header and crop row misalignment that can be adapted for use in row crop environments that can overcome and/or correct header and crop row misalignment errors due to various factors, which can include, but are not limited to, stack up of errors from the remote positioning system, uneven terrain, variations in planting and harvesting path order, and the like, and which overcomes one or more of the problems and shortcomings set forth above.

SUMMARY OF THE INVENTION

It is an object of the present invention to provide a method and a system for automatically providing a steering correction to a steering command of an agricultural harvesting machine auto guidance system in response to a misalignment between a row of crops and a header row. In this method, crops, such as corn or cotton, are planted in rows, and remote positioning system information is used to generate a map of information representative of locations of the rows of crops. This map is used to create a harvesting swath pattern which is used by the harvesting machine auto guidance system, along with remote position sensing information, to align row units of the machine with rows of crops and produce steering commands to steer the harvesting machine along the rows. An apparatus, such a pair of row sensors is provided in association with the row units for sensing an amount of misalignment between the row units and the rows of crops and outputting information representative thereof to the auto guidance system. If the amount of misalignment is beyond a predetermined range and the steering command will maintain the amount of misalignment, the steering command is corrected as a function of the amount of misalignment between the row unit and the row of crops. For example, if the row sensors indicate the rows of crops are too far to the left within the row units, and the steering command steers the harvesting machine straight or to the right, the steering command is corrected to steer the harvesting machine to the left to realign the row units and the rows of crops.

As an alternative, the auto guidance system may execute the steering command prior to checking the row sensors for misalignment. If the row sensors indicate misalignment between the row unit and the row of crops, than a steering correction command is executed.

It is another object to provide a system which automatically provides a steering correction to the steering command of an agricultural harvesting machine, in response to misalignment between rows of crops and the cutting element of the machine. A header on the harvesting machine includes row dividers that define an aperture operable to isolate a crop in a row of crops and guide the crop along the aperture towards a cutting element. Row sensors located on the row dividers provide an indication of a location of the crops relative to the cutting element within the aperture. The automatic guidance system of the harvesting machine is operable to receive machine position information from a remote position sensing system, such as a differential global positioning system, and to determine a steering command to control the machine to follow a predetermined path along the rows of crops. When the row sensors indicate that the location of the crop is beyond a predetermined range of locations in the aperture the steering command is automatically adjusted to align the crops with the cutting element of the harvester

BRIEF DESCRIPTION OF THE DRAWINGS

These and other advantages of the present invention are best understood with reference to the drawings, in which.

DETAILED DESCRIPTION OF THE INVENTION

Figure 1:
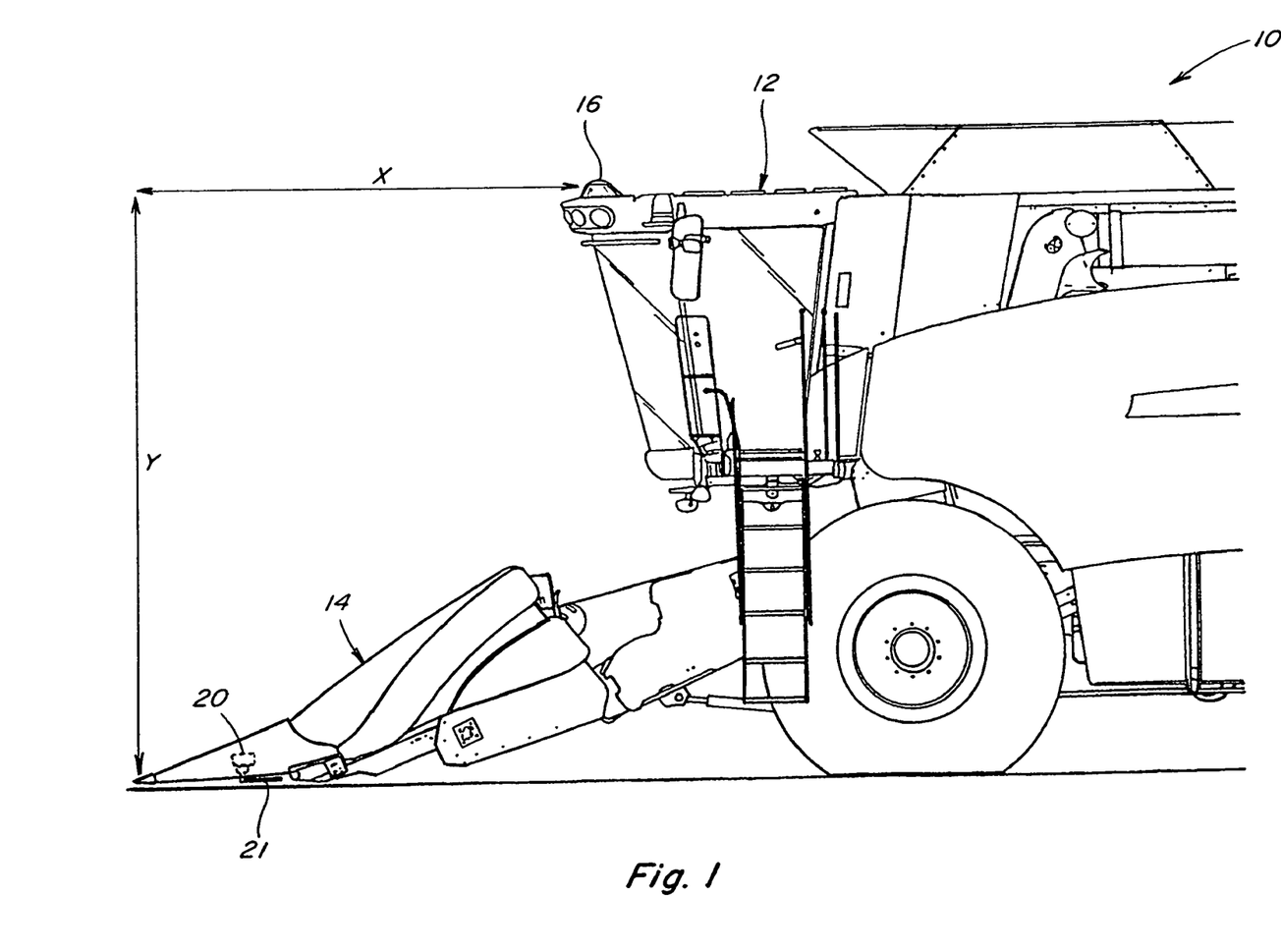
FIG. 1 is a side view of a front portion of an agricultural combine including a specialized header for harvesting corn that may be used with the method and system of this invention.
Figure 2:
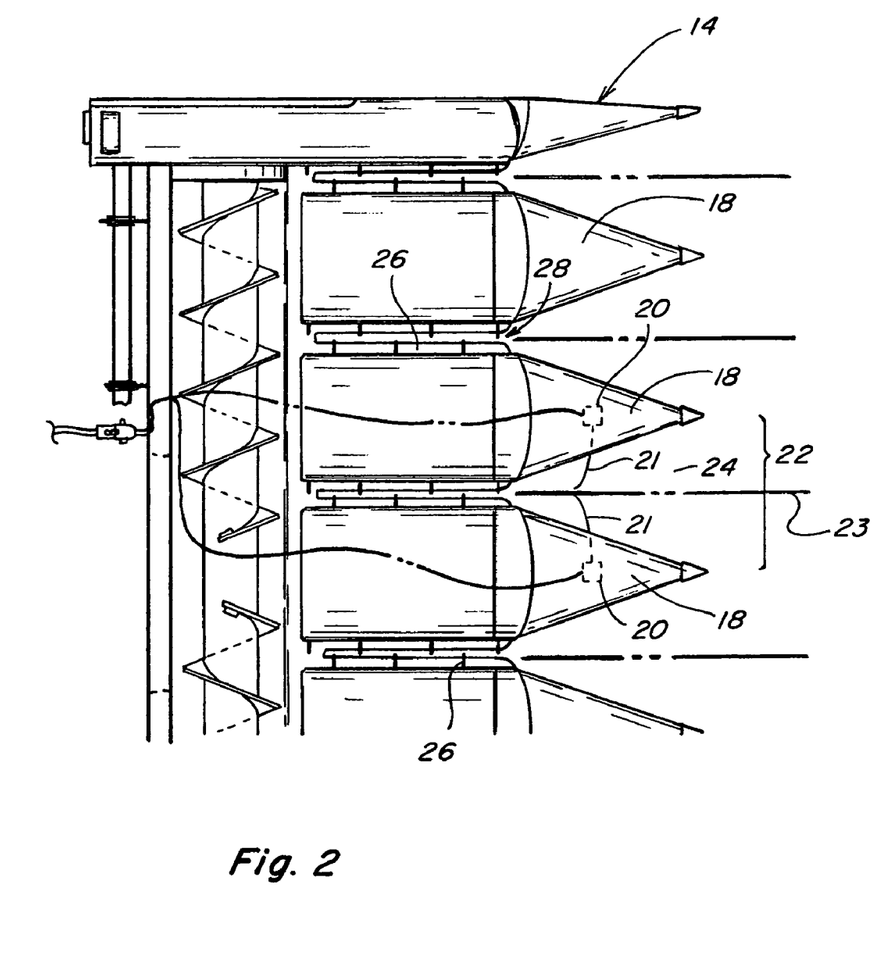
FIG. 2 is a partial top view of the header of the combine of FIG. 1.

Referring now to the drawings, FIG. 1 shows a front portion of a combine 10 with a specialized header 14 for harvesting rows of crops such as corn. An operator cab 12 is equipped with a remote positioning system sensor 16, such as a differential global positioning system (DGPS) sensor, for receiving information representative of the combine 10 position in a field. FIG. 2 shows a partial top view of header 14 including row dividers 18 and row sensors 20. A pair of row dividers creates a row unit 22 defining an aperture 24. As combine 10 harvests a swath of a field, row dividers 18 separate stalks of the crops within the rows and guide the stalks towards snapping rolls 26 in stalkways 28 of header 14. Row sensors 20 may be equipped with fingers 21 which physically detect crops within aperture 24 and provide an indication of crop position or alignment with a centerline 23 of row unit 22.

Figure 3:
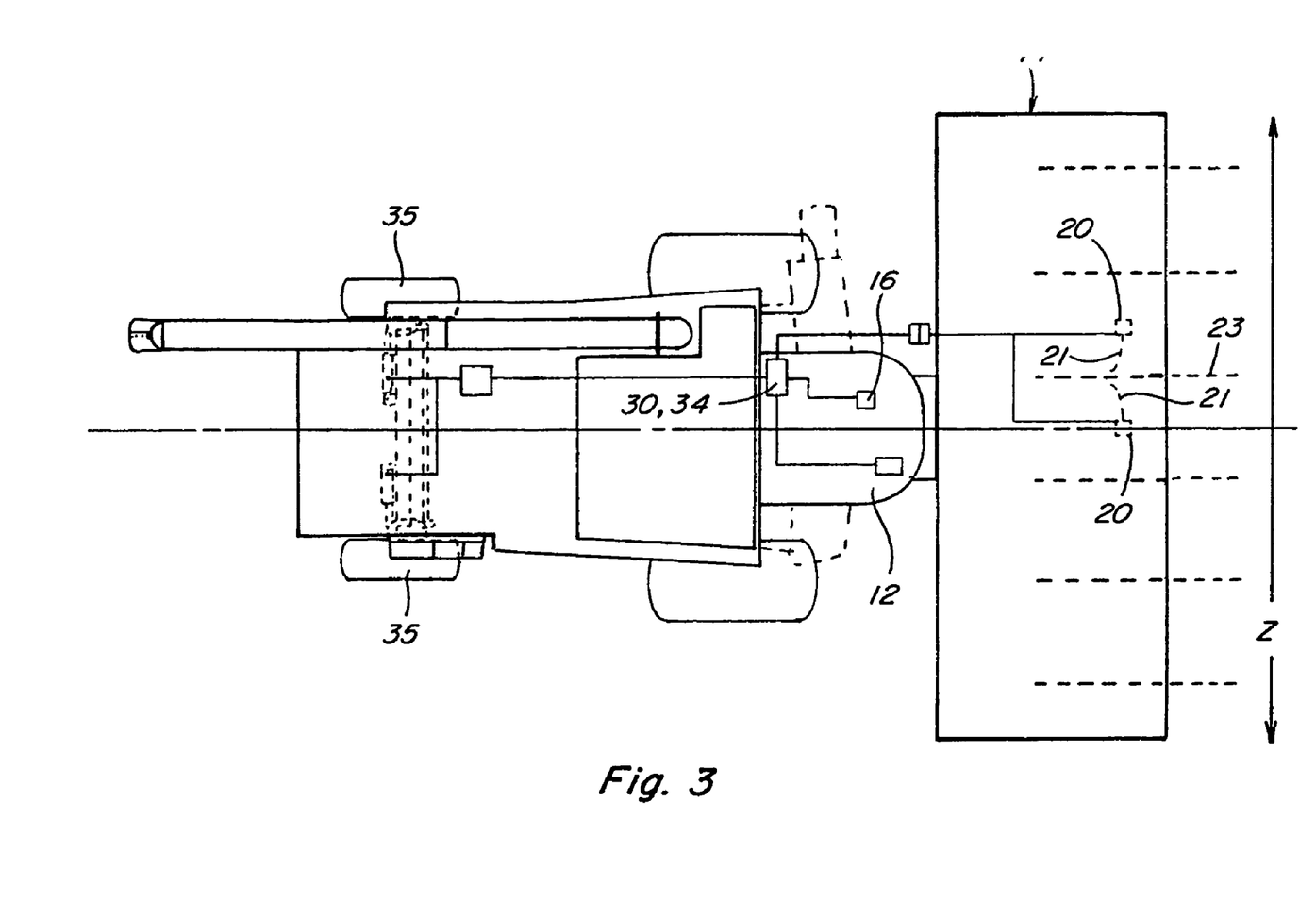
FIG. 3 is a simplified top view of the combine of FIG. 1 depicting use of a 6 row header.
Figure 4:
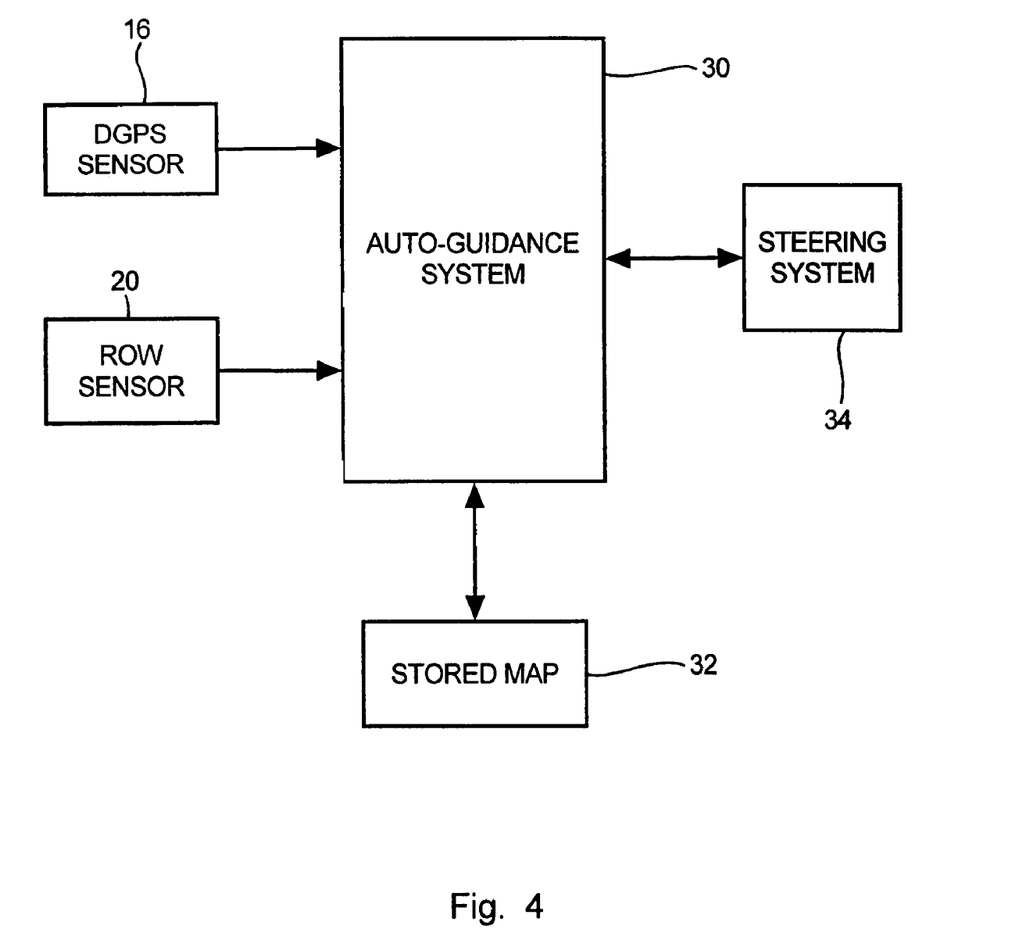
FIG. 4 is a block diagram representation of the system of the invention.

As shown in FIGS. 3 and 4, combine 10 is equipped with an automatic guidance system 30 that determines and provides steering commands for a steering system 34 of combine 10 when harvesting crops. Automatic guidance system 30 uses a previously generated map 32, typically created while planting, that includes information representative of locations of rows of crops as well as information from DGPS sensor 16 which is representative of combine 10 location. During harvesting, it is desirable to align the stalks with stalkways 28 along centerline 23 to minimize crop damage or loss at snapping rolls 26 (see FIG. 2).

Errors that may contribute to misalignment between the stalks and stalkways 28 may be introduced from calculations translating DGPS sensor 16 position to header row unit 22 position based on the geometry of combine 10. Variations or approximations in distances denoted x, y and z on combine 10 shown in FIGS. 1 and 3 may impact the auto guidance system 30 steering commands, which in turn, may affect the alignment of rows of crops and header row unit 22, which may ultimately affect the alignment of the stalks with snapping rolls 26 in stalkways 28. In addition, similar errors may be inherent in map 32 generated during planting due to analogous variations or approximations in distances denoted X and Z (Y coming out of the page) in the geometry of planter 29 shown in FIG. 3A.

Figure 3A:
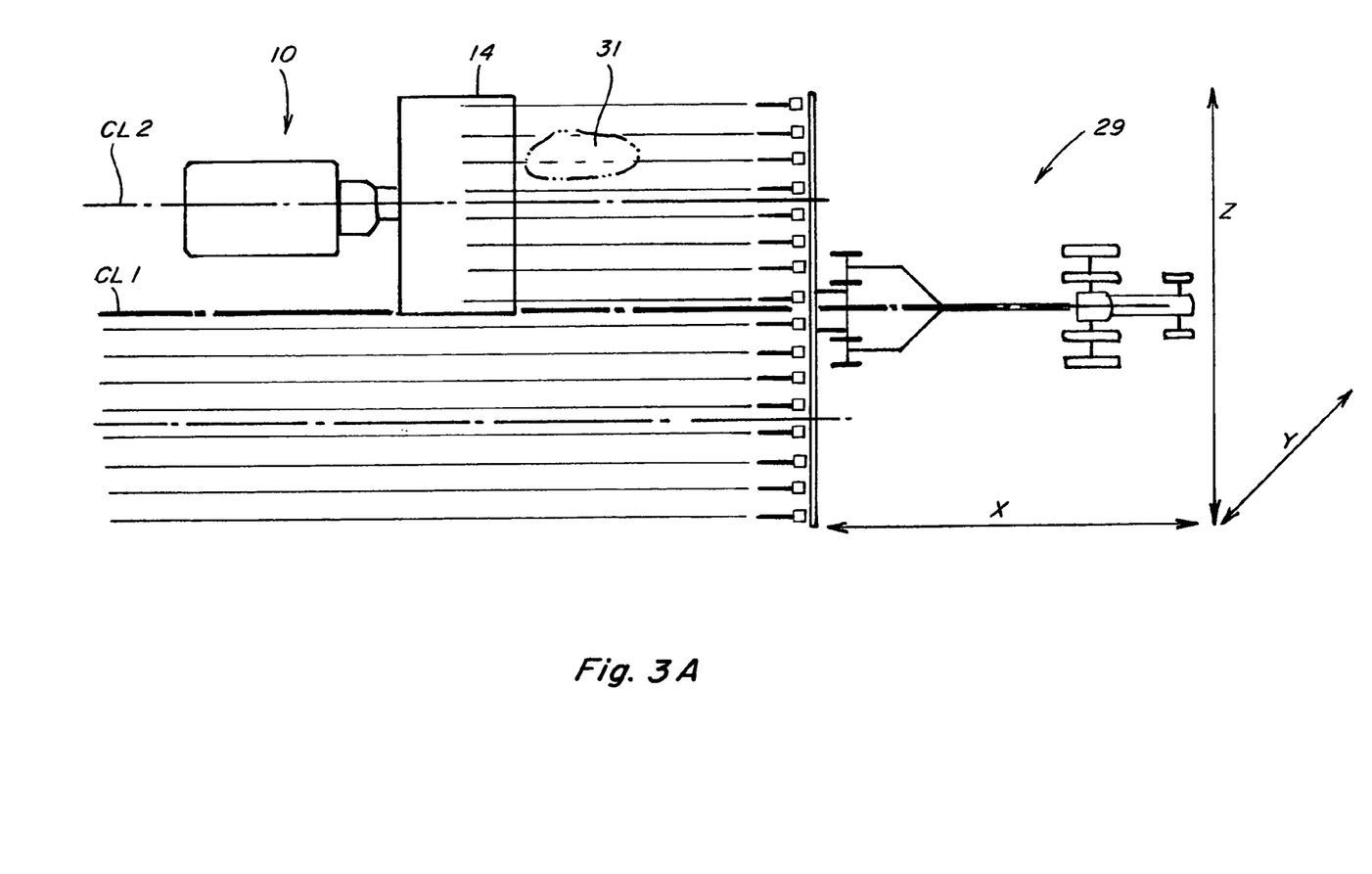
FIG. 3A is a simplified top view of a tractor equipped with a 24 row planter and the combine of FIG. 1 equipped with an 8 row header depicting one possible variation between the planter centerline used during planting and the combine centerline used during harvesting.

An additional source of error may be introduced during initial alignment of combine 10 with the rows of crops at the beginning of a swath. It is not unusual to use a 24 row planter 29 during planting and a 6 or 8 row header 14 on combine 10 during harvesting. As shown in FIG. 3A, these vehicles may have auto guidance system 30 reference lines, such as vehicle centerlines denoted CL1 and CL2, at different locations. This variation in reference lines and the likelihood that the field will be harvested in a different swath pattern than it was planted, may also impact the steering commands generated by auto guidance system 30 and therefore the alignment of the rows of crops and header row unit 22.

Variations in terrain over a field such as ruts, holes, hills, and the like, may also ultimately contribute to alignment errors. For example, combine 10 will likely encounter a change in terrain, such as a dip or a rut 31, during harvesting the swath shown in FIG. 3A. Planter 29, having different centerline CL1 and wheel locations, would not likely have encountered rut 31. It is therefore possible that no indication of the terrain change, or any resulting variation in crop location resulting therefrom, is represented in map 32. Errors such as those listed herein may stack up and the steering commands provided by auto guidance system 30 may produce some misalignment between row units 22 and crop rows.

According to the invention, auto guidance system 30 integrates alignment information from row sensors 20 to correct or adjust the steering command to steering system 34 as shown in FIGS. 3 and 4. FIG. 3 shows a top view of combine 10 with interconnections between DGPS sensor 16, header row sensors 20 and auto guidance system 30. Auto guidance system 30 provides steering commands to steering system 34 which provides commands to actuate steerable wheels 35 of combine 10.

Figure 5:
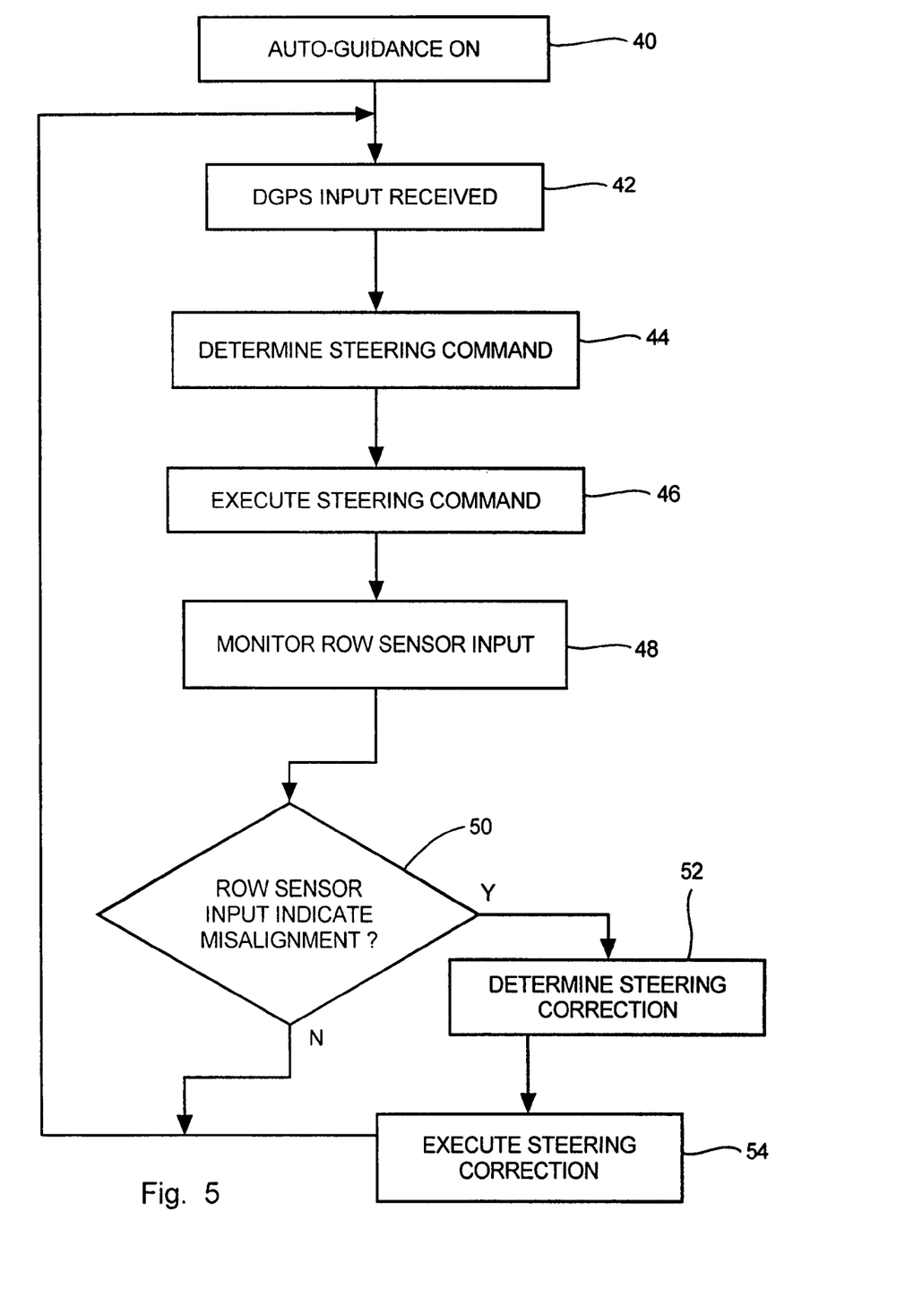
FIG. 5 is a top level logic flow diagram depicting steps of one embodiment of the method of the invention.

FIG. 5 illustrates an embodiment of the method of this invention. Using map 32 generated during planting, a harvesting swath pattern will be implemented. At block 40 auto guidance system 30 is verified as operational, and at block 42 DGPS information is received by auto guidance system 30. Based on DGPS information and information from map 32, a steering command is determined by auto guidance system 30 and executed by steering system 34 at blocks 44 and 46 respectively. At block 48 auto guidance system 30 monitors information from row sensor 20. If row sensor 20 indicates misalignment of crops relative to centerline 23 of row unit 22 at decision block 50, control is directed to block 52 where auto guidance system 30 determines a steering correction and steering system 34 executes that steering correction at blocks 52 and 54 respectively.

Figure 6:
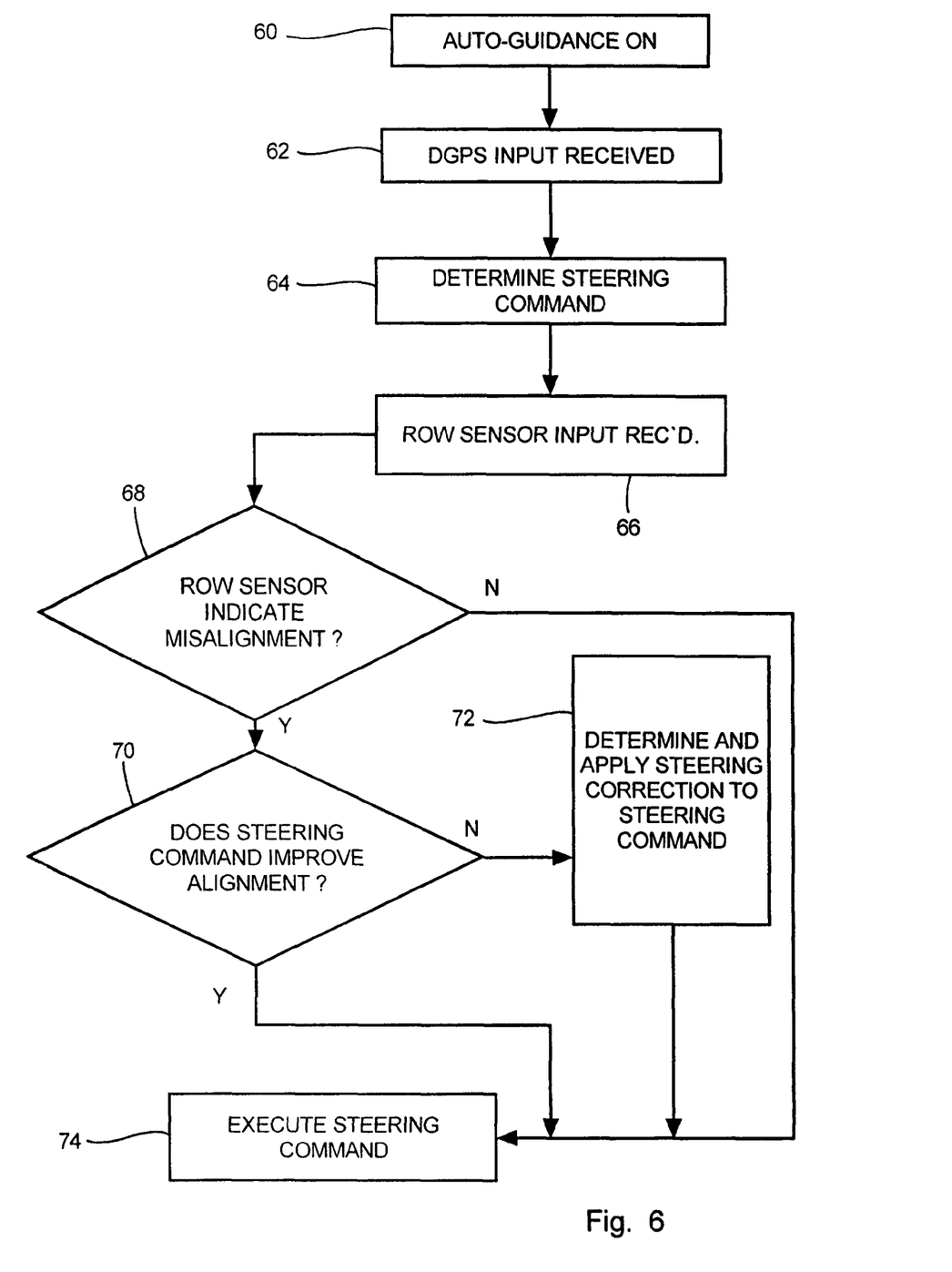
FIG. 6 is a top level logic flow diagram depicting steps of another embodiment of the method of the invention.

Another embodiment of the method of the invention is shown in FIG. 6. Again using map 32 generated during planting, a harvesting swath pattern will be implemented. At block 60 auto guidance system 30 is verified as operational, and at block 62 DGPS information is received by auto guidance system 30. Based on DGPS information and information from map 32, a steering command is determined by auto guidance system 30 at block 64. Next, auto guidance system 30 receives information from row sensors 20. If row sensors 20 indicate misalignment of crops relative to centerline 23 of row unit 22 at decision block 68, auto guidance system 30 determines if the steering command will re-align the crops relative to centerline 23 at decision block 70. If the steering command will not re-align the crops relative to centerline 23, auto guidance system 30 computes a correction to, or modification of, the steering command at block 72. Finally, steering system 34 executes the steering command at block 74.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method for automatically steering an agricultural harvesting machine, comprising the steps of:
　planting crops in rows utilizing a row planter;
　generating and storing a map of information representative of locations of the rows of crops planted by the row planter, the map identifying and storing a centerline of the row of crops in a swath formed by the row planter;
　providing an automatic guidance system for guiding the harvesting machine along the rows;
　retrieving the map for use by the harvesting machine;
　aligning row dividers of the harvesting machine with the rows;
　determining a steering command to steer the harvesting machine row dividers along the rows, wherein fewer row dividers of the harvesting machine are provided in which to align to rows in each swath formed by the row planter relative to a greater number of rows planted by the row planter in each swath;
　providing an apparatus for re-calculating a new centerline from a combination of the previous map and present row alignment information by
　　i. providing a pair of sensors disposed on row dividers of a header and having a portion of each sensor extending to a centerline of the harvesting machine for
　　ii. sensing an amount of misalignment between a centerline of the harvesting machine as compared to the centerline of the row planter previously defined by the map and outputting information representative thereof, and
　　iii. sensing an amount of misalignment between at least one of the row dividers and at least one of the rows of crops and outputting information representative thereof; and
　if the amount of misalignment is beyond a predetermined range:
　　i. determining if the steering command will maintain the amount of misalignment beyond the predetermined range; and
　　ii. correcting the steering command as a function of
　　　a) the amount of misalignment between the previously defined centerline and the centerline defined by the harvesting machine row dividers, and
　　　b) the amount of misalignment between the row dividers and the row of crops; and
　executing the steering command.

2. The method of claim 1, wherein the apparatus for sensing the amount of misalignment between at least one of the row units and at least one of the rows of crops and outputting information representative thereof comprises one of each of the pair of sensors positioned on a row divider of the header positioned next to the centerline of the harvesting machine, each sensor having a finger extending therefrom and through a space to the centerline, both fingers cooperating to contact a periphery of crops in the row and providing information regarding alignment with the row of crops and providing information regarding alignment of the centerline of the harvesting machine relative to the row of crops.

3. The method of claim 1, wherein a differential guidance positioning system is used for generating the map and determining the steering command to steer the harvesting machine along the rows.

4. The method of claim 1, wherein the step of correcting the steering command includes incrementally shifting a reference line of the automatic guidance system.

5. A method for harvesting row crops utilizing an auto guidance system, comprising the steps of:
　periodically outputting a steering command to a steering control system of a harvesting machine as a function of signals received from a remote positioning system and a stored map representative of locations of crops, the map identifying and storing a centerline of the rows of crops in swaths formed by a row planter, wherein each swath formed by the row planter is larger than a swath formed by the harvesting machine;
　monitoring proximity of sensors of the harvesting machine to the crops as the harvesting machine is harvesting the crops, the sensors positioned on each side of a centerline of a header of the harvesting machine, a portion of each of the sensors extending toward the centerline and outputting a signal representative of both crop position and centerline position, the sensors providing information for re-calculating a new centerline from a combination of the previous map and the present row alignment; and modifying the steering control signal as a function of the information representative of alignment with the new centerline of the harvesting machine and row alignment of the harvesting machine relative to the crops during harvesting.

6. The method of claim 5, wherein the remote positioning system comprises a differential guidance positioning system.

* * * * *